Oct. 17, 1933.   B. B. LING   1,931,388
PIE CUTTER
Filed July 27, 1932
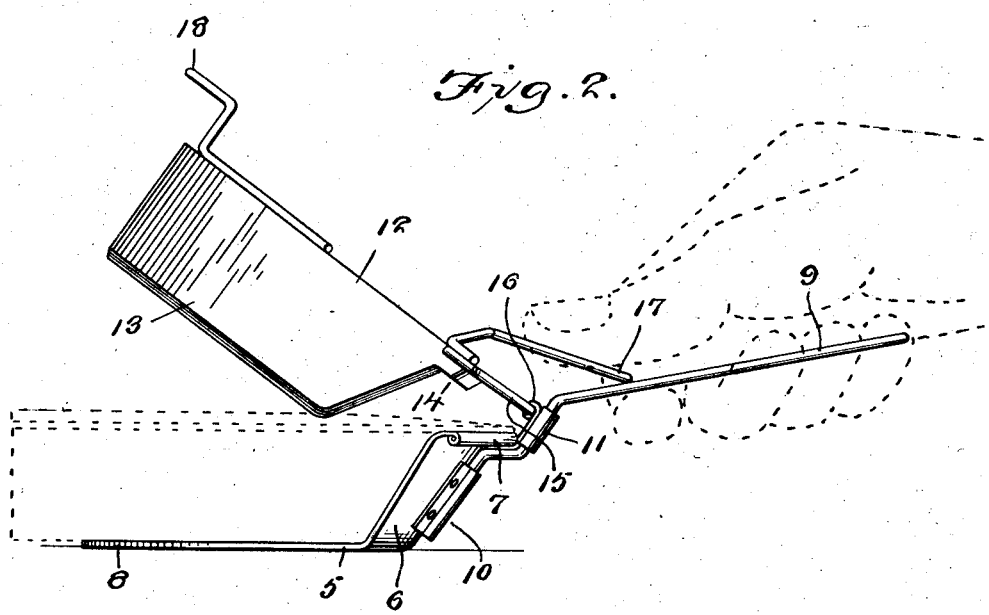
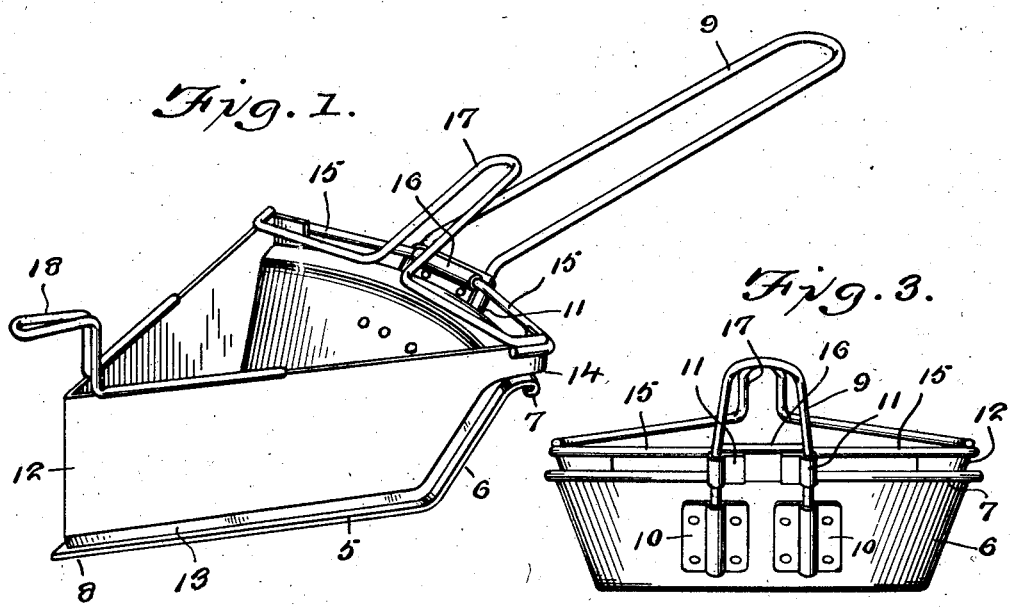
Benjamin B. Ling
INVENTOR
BY Victor J. Evans & Co.
ATTORNEY Patented Oct. 17, 1933

1,931,388

UNITED STATES PATENT OFFICE 1,931,388

PIE CUTTER

Benjamin B. Ling, Columbus, Ohio

Application July 27, 1932. Serial No. 625,080

1 Claim. (Cl. 146—209)

The invention relates to a pie knife and more especially to a pie cutter.

The primary object of the invention is the provision of an implement of this character, wherein a pie can be cut into equal proportions for the serving of pieces of the same, the implement being of novel construction so that it can be handled in an easy manner and also enables the removal of the pieces of pie from a pan or other utensil in which it may be baked.

Another object of the invention is the provision of an implement of this character, wherein a pie or cake can be sliced or cut for the convenient serving of pieces thereof and also eliminates the necessity of hand contact in the handling or serving of the severed or cut pieces.

A further object of the invention is the provision of an implement of this character which is extremely simple in construction, reliable and efficient in its purpose, readily and easily operated, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a perspective view of the implement constructed in accordance with the invention.

Figure 2 is a side elevation of the same showing by dotted lines the hand of a person operating the implement, the same being in position for cutting a piece of pie.

Figure 3 is a rear elevation of the implement.

Similar reference characters indicate corresponding parts throughout the several views in the drawing.

Referring to the drawing in detail, the implement comprises a trowel-like section 5 which in its marginal outline follows a substantially triangular form provided with the forwardly inclined heel portion 6 having a downwardly, inwardly and upwardly curled edge or rim 7 while the opposite toe end 8 is pointed and this section 5 can be inserted between a pan and a pie therein so that a portion of the latter will rest thereon.

Attached to the heel 6 and extending outwardly beneath the edge or rim 7 medially thereof is a handle 9 preferably made from a single length of wire folded on itself and the ends of said wire are engaged in sleeve-like retaining brackets 10 riveted or otherwise secured to the said portion 6 of the section 5 and in this fashion the handle 9 is united therewith.

Straddling the handle 9 is a bridge piece 11, the same being located close to the edge or rim 7 and to which is swingingly connected the substantially V-shaped cutting knife 12, the forward and converging portions of which constitute the blades 13, these at their heel portions being cut into at 14 to clear the portion 6 and the edge or rim 7 thereof on the lowering of the blades 13 onto the section 5 for the severance of a piece of pie. The knife 12 carries a hinge pintle 15 which is accommodated in a pintle sleeve 16 riveted or otherwise mounted upon the bridge piece 11 and in this manner the knife 12 is swingingly supported.

Straddling the knife 12 next to the pintle 15 is an actuating finger piece 17 which is centered with respect to the handle 9 and is manually operated by the hand of a user of the implement so that on pressure being applied to the finger piece 17 the knife 12 can be raised from the section 5 to bring the said knife into cutting position on the lowering thereof or movement of the same toward the section 5, the elevated position of the knife 12 being shown in Figure 2 of the drawing while the lowered position of the knife is shown in Figure 1 thereof.

At the outer end of the knife 12 and straddling the blades 13 thereof is a finger hold 18 so that the user of the implement can by manipulation of the hold 18 cause the blades 13 to penetrate into the body of the pie for the cutting of a piece therefrom. The piece of pie cut will conform to the disposition of the blades 13 of the knife 12 and its outline will be substantially that of the section 5 of the implement. Thus it will be seen that a whole pie can be cut into uniform pieces and such pieces cut may be individually served when at rest upon the section 5.

The implement may be carried in the hand of a user and the knife 12 operated by such user for the cutting or severing of the pie body into a number of pieces, these being of equal size to each other.

The section 5 is readily insertable in a pan between it and the pie so as to enable the removal of the piece of pie cut by the implement and the lifting of such piece from the pan for the serving of the piece.

It is of course to be understood that it is preferable to have the pointed toe end 8 of the section 5 of inherent flexible quality because it proves most advantageous to a user when first inserting this toe end between the pie and the pan and the flexing of such end will enable the manipulator to obtain an initial or good start in the separation of the pie from the pan and the severing of a piece of such pie for the cutting thereof from the remainder of the same, the flexible portion being in scope of approximately one inch radius from the pointed tip of the toe end 8.

What is claimed is:

An implement of the character described comprising a substantially trowel-like section forming a blade, sleeve-like brackets secured to the wider end of said section, a single length of wire folded on itself to provide a handle having its ends received in the sleeve-like brackets, a rim at the wider end of said section, a bridge piece straddling the handle next to the rim, a pintle sleeve on the bridge piece, a hinge pintle journaled in the pintle sleeve, a substantially V-shaped cutting knife forming forwardly converging cutting blades united with the hinge pintle and movable onto and off of said section, a finger piece carried by the knife and having a medial handle disposed in confronting relation to the first named handle, the blades being cut away at the wider portion of the section to form a clearance for the latter, and a finger piece carried by the knife adjacent to the forwardly converging ends of its blades.

BENJAMIN B. LING.